United States Patent [19]

Liu et al.

[11] Patent Number: 4,962,503

[45] Date of Patent: Oct. 9, 1990

[54] WAVELENGTH STABILIZATION FOR A PULSED TUNABLE LASER

[75] Inventors: Chi-Sheng Liu, Monroeville Boro, Pa.; Koon W. Loh, Chatham, N.J.

[73] Assignee: Westinghouse Electric Corp., Pittsburgh, Pa.

[21] Appl. No.: 670,731

[22] Filed: Nov. 13, 1984

[51] Int. Cl.$^5$ ............................................... H01S 3/13
[52] U.S. Cl. ........................................ 372/32; 372/20; 350/166
[58] Field of Search ....................... 372/18, 20, 23, 32, 372/33; 332/7.51; 350/163, 166

[56] References Cited

U.S. PATENT DOCUMENTS

| | | | |
|---|---|---|---|
| 3,471,803 | 10/1969 | Forster | 372/32 |
| 3,482,099 | 12/1969 | Goodwin | 372/32 |
| 4,081,760 | 3/1978 | Berg | 372/20 |
| 4,150,342 | 4/1979 | Johnston et al. | 372/32 |
| 4,468,773 | 8/1984 | Seaton | 372/20 |

OTHER PUBLICATIONS

Bondorenko et al., "Stabilization of a . . . Reference", 7/20/75, pp. 46–47, JETP Lett., vol. 22, #2.
Morinaga et al., "Stabilization of a . . . Offset–Lock", 2/77, pp. 383–384, Japan J. Appl. Phys., vol. 16, #2.
Suzuki, "Simultaneous Tuning . . . Wavelengths", 1982, Jpn. J. Appl. Phys. vol. 21, #10.

Primary Examiner—Nelson Moskowitz
Attorney, Agent, or Firm—D. Schron

[57] ABSTRACT

A pulse laser system utilized for communication transmits a modulated pulsed laser beam having a precise wavelength to match a receiver. An etalon is positioned in the resonant cavity of the laser and is adjustable to tune the laser. A continuous wave reference beam is provided and is compared with the laser output beam and if the wavelength's bear other than a predetermined relationship with respect to one another, a control signal is generated to adjust the etalon in the laser resonant cavity. In one embodiment another etalon is placed in the reference beam path as well as the laser beam path with the transmitted beams being detected in order to derive normalized proportionality factors relating to each beam so that a comparison of the proportionality factors may be made and utilized for control purposes.

7 Claims, 4 Drawing Sheets

WAVELENGTH STABILIZATION FOR A PULSED TUNABLE LASER

BACKGROUND OF THE INVENTION

1. Field of the Invention The invention in general relates to laser systems, and particularly to the accurate control of the wavelength of the output laser beam.

2. Description of the Prior Art

Many laser systems provide an output laser beam having a wavelength which varies over a limited spectrum. In some systems however, such as in the field of laser communication, laser isotope separation, laser chemistry and remote sensing, to name a few, it is imperative that the laser provide an output beam having a single unvarying precise wavelength. Included in this category are pulse laser systems and the present invention provides an arrangement for accurately controlling the laser on a pulse to pulse basis so that the wavelength of the laser beam is precisely held to a predetermined value.

SUMMARY OF THE INVENTION

A pulse laser apparatus for communication or other purposes, in accordance with the present invention, includes a pulse laser means operable to provide a pulsed output laser beam which may be modulated with information, as desired. An adjustable etalon is positioned in the beam path within the resonant cavity of the laser means for tuning purposes. Means are provided for generating a continuous wave (CW) reference beam the wavelength of which is compared to the wavelength of the laser beam to generate a control signal. Means responsive to the control signal are provided for adjusting the etalon so that any necessary tuning to make the laser beam have a wavelength bearing a known relationship to the wavelength of the reference beam may be accomplished.

DESCRIPTION OF THE PREFERRED EMBODIMENT

Figure 1:
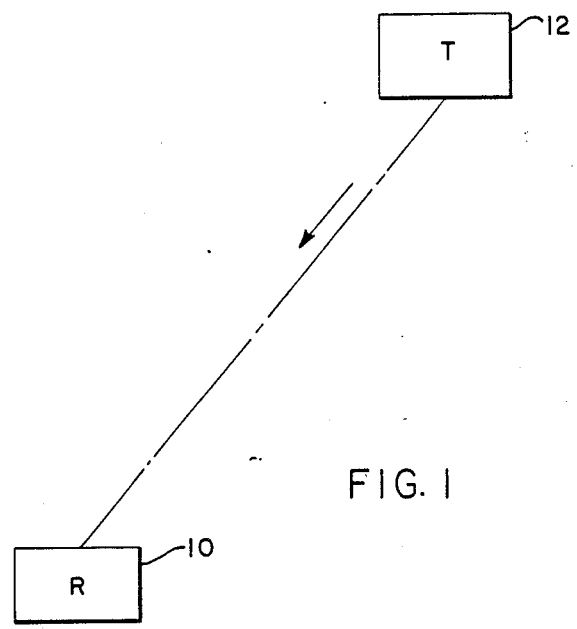
FIG. 1 is a block diagram illustrating one use for a pulsed laser system.

FIG. 1 illustrates one use for a stabilized pulsed tunable laser system. The vehicle 10 includes a receiver for receiving information from another vehicle 12 carrying a pulsed tunable laser transmitter.

Since the vehicle 10 may be at deep ocean depths, only a very relatively narrow spectrum of light in the green or blue-green range is utilized since these wavelengths are less attenuated in the water than other light. In order to filter out background illumination such as from the sun and/or bioluminescence, and constituting objectionable noise, the underwater receiver is designed to detect a single precise wavelength from the transmitter and to filter out all others. Accordingly, if the pulsed laser of the transmitter does not precisely transmit at this exact same wavelength or if it drifts from pulse to pulse, then communication between the two vehicles would be objectionably interrupted or even totally destroyed.

Figure 2A:
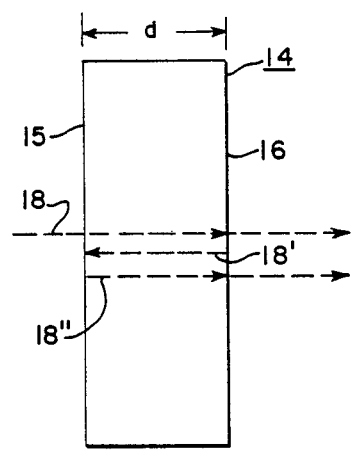
FIGS. 2A and 2B serve to illustrate the operation of an etalon.
Figure 2B:
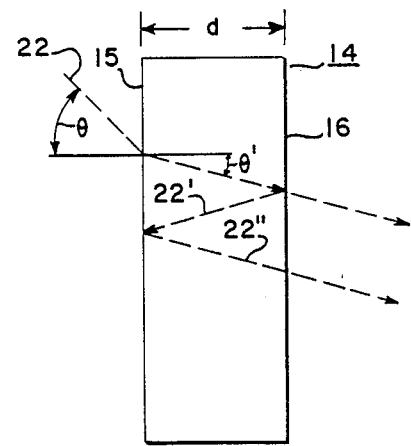

In the present invention any correction of the transmitted wavelength is performed in the interpulse period of the laser with a control arrangement that utilizes etalons, the principal of which is illustrated in FIGS. 2A and 2B to aid in an understanding of the present invention.

Etalon 14 is a disk such as quartz having flat opposed parallel surfaces 15 and 16 separated by a distance d. In FIG. 2A light beam 18, on the optical axis of the etalon, passes through the front surface 16 with a portion of the beam being reflected back at the interface and designated by the numeral 18'. Beam 18' itself is reflected at the surface 15 interface with the reflection being designated by the numeral 18" and emerging from the front face 16. Although the reflections are shown displaced from one another they are actually all on the optical axis.

Figure 3:
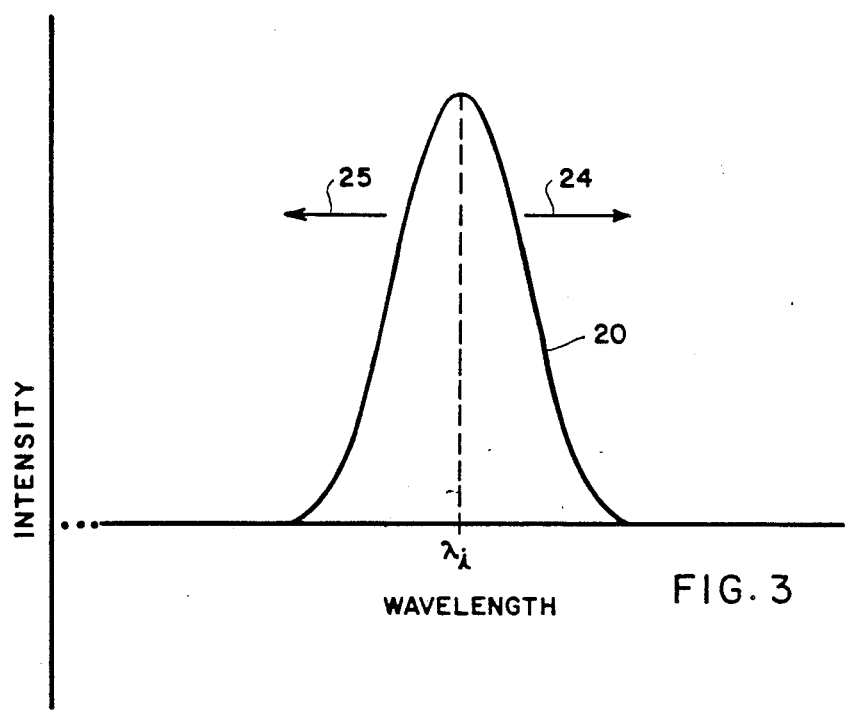
FIG. 3 is a transmissivity curve associated with an etalon.

Multiple reflections continue and if the distance d is equal to a half wavelength, or a multiple thereof, of the beam, then all reflections passing through the front surface 16 will be in phase with the original beam and will reinforce it such that maximum intensity for that particular wavelength is transmitted, with the intensity decreasing for longer and shorter wavelengths. This operation is illustrated in FIG. 3 wherein curve 20 is a transmissivity curve for the etalon. Transmitted light intensity is plotted on the vertical scale and wavelength on the horizontal scale. $\lambda_i$ represents the wavelength of light beam 18 and for this particular wavelength maximum intensity is transmitted. The intensity of the transmitted beam falls off in accordance with curve 20 as the wavelength of light beam 18 is increased or decreased. Since $$\lambda_i = \frac{2nd}{N},$$

where N is an integer and n is the index of refraction, then the entire transmissivity characteristic of the etalon would include a plurality of such curves 20 each peaking at a wavelength corresponding to the above equation for different values of N.

FIG. 2A therefore illustrates a situation where a laser light beam is coincident (or parallel) with the optical axis of the etalon. FIG. 2B illustrates another situation wherein a laser light beam 22 impinges upon surface 15 at an incident angle $\theta$ and refracts at an angle $\theta'$. The internal reflected 22' results from the reflection of the light beam from front surface 16 and another reflected beam 22" is the result of the reflection from surface 15. The light from the reflections emerging from the front surface 16 are all in phase with the original beam and therefore reinforce. With this reinforcement a maximum intensity is transmitted for the particular wavelength of the beam 22 however the wavelength would be equivalent to $$\lambda = \frac{2nd \cos \theta'}{N},$$

Since maximum intensity has been transmitted for a different wavelength utilizing the exact same etalon as in FIG. 2A, the angular displacement of the impinging beam relative to the optical axis has the effect of shifting curve 20 either up or down in wavelength as indicated by arrows 24 and 25 in FIG. 3.

Figure 4:
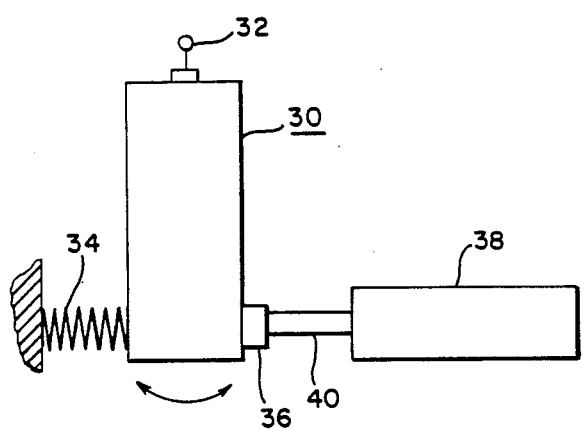
FIGS. 4 and 5 illustrate two methods for tuning the etalon.

Accordingly, by changing the angle of incidence of the laser light beam impingement on the etalon, different $\lambda_i$ wavelengths may be transmitted. The varying of the impingement angle may be accomplished in a number of ways, one of which is illustrated in FIG. 4. An etalon 30 is depicted as being pivotal about point 32 and is contacted on one surface by means of spring 34 and on the other surface by contact pad 36. A motor 38 drives a worm gear 40 contacting pad 36 so as to cause lateral movement of the etalon against the spring 34 to effect an angle change. By way of example, motor 38 may be a stepping motor such that worm gear 40 causes angular movement of etalon 30 in minute angular steps, each being a small fraction of a degree. Thus by changing the angle of the etalon relative to the laser optical axis there is provided an adjustable filter.

Figure 5:
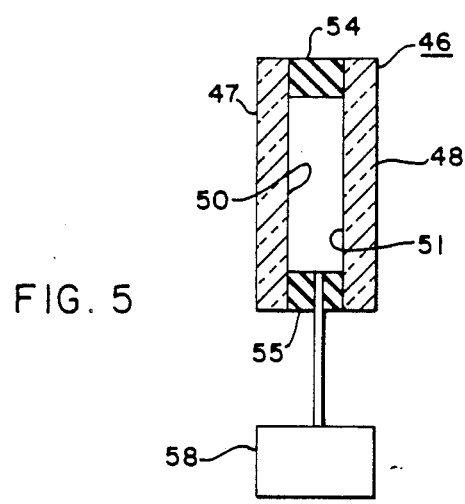

Another type of well known etalon which will perform the same function is illustrated in FIG. 5. Etalon 46 includes two spaced apart plates 47 and 48 having opposed parallel surfaces 50 and 51 positioned by flexible spacers 54 and 55. The interior volume between surfaces 50 and 51 may be pressurized and depressurized by means of a controlled gas supply 58 which is operable to expand or contract the interior volume thereby changing the distance d between the surfaces 50 and 51 to thereby shift the transmissivity curve as previously explained.

Figure 6:
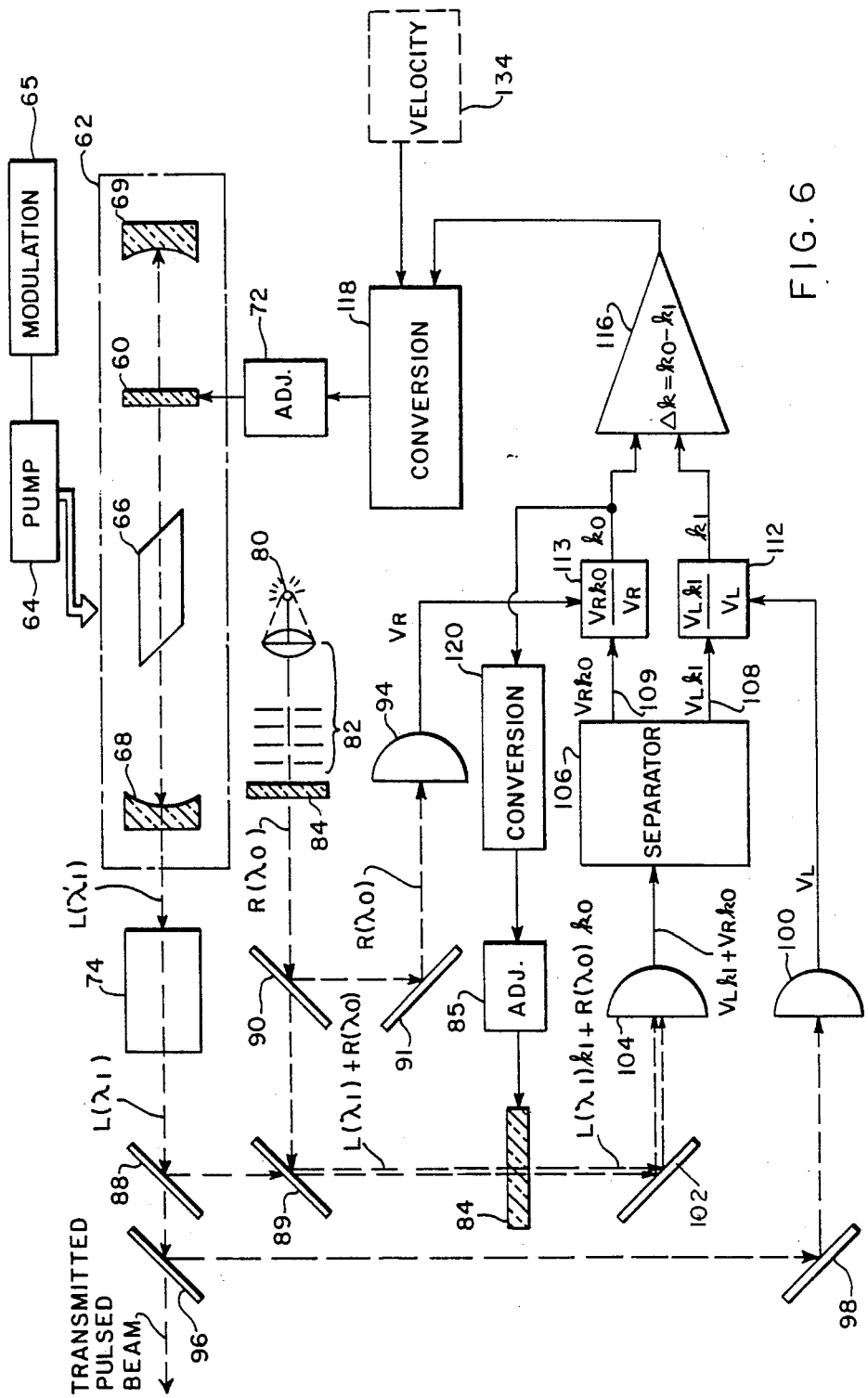
FIG. 6 is a block diagram illustrating one embodiment of the present invention.

FIG. 6 illustrates one embodiment of the present invention which utilizes two etalons in their function as adjustable filters. A first etalon 60 is disposed directly in the resonant cavity of tunable pulse laser 62 pulsed from a pumping source 64 which may be modulated with information to be transmitted as indicated by reference numeral 65. The laser includes a laser medium 66 and a laser optical path between partial and fully reflective resonant cavity mirrors 68 and 69. The wavelength of the laser light beam for each pulse may be accurately controlled by adjustment of etalon 60 in a well known manner, two of which have been previously described. Etalon adjustment circuit 72 is provided for this purpose and may be comprised of the stepping motor embodiment or gas pressurization embodiment, by way of example.

For some applications the selected laser medium may not provide the required wavelength. In such instances, the generated laser light may be utilized as a pump for a dye cell or a raman cell 74 which functions to proportionately shift the light wavelength to the required range. In FIG. 6 the letter L designates the light beam originated by the laser $\lambda'_1$ designates the wavelength of the light produced by the laser medium 66 and $\lambda_1$ designates the wavelength of the light emanating from the dye or raman cell 74.

Basically, the laser-produced light, which may be subject to objectionable drift, is tuned and locked into a predetermined precise reference source which could be an atomic resonance lamp. Light from reference source 80 is collimated by optical system 82 and since the light may contain a plurality of wavelengths, a filter 84 is provided to pass only light of the selected reference wavelength. The light beam associated with the reference source is designated by the letter R and $\lambda_0$ designates the wavelength of the light passed by filter 84.

Another etalon, 84 together with an associated adjustment circuit 85 is provided and is disposed in the path of both the laser and reference beams. Beam splitter 88 directs the laser beam to etalon 84 through beam splitter 89, while the reference beam is directed to etalon 84 by means of beam splitters 90 and 89.

Beam splitter 90 also directs the reference beam to a mirror 91 the reflection from which is provided to a first detector 94 operable to provide an output voltage $V_R$ proportional to the intensity of the reference beam impinging upon it. By means of beam splitter 96 and mirror 98, the laser beam impinges upon a second detector 100 which provides an output voltage $V_L$ proportional to the intensity of the laser beam.

After passage through etalon 84 and reflection from mirror 102 the combined laser and reference beams are directed to detector 104 which provides an output voltage signal made up of one component, $V_L k_1$, attributable to the laser beam, and another component $V_R k_0$, attributable to the reference beam, as will be explained. These two signals are separated in separator 106 and provided on respective output lines 108 and 109.

The values on lines 108 and 109 are normalized in respective normalizing or divider circuits 112 and 113 which respectively also receive the $V_L$ and $V_R$ signals from detectors 100 and 94, with the division resulting in respective ratio output signals of $k_1$ and $k_0$. A difference, $\Delta k$, between $k_0$ and $k_1$ is derived by subtraction circuit 116. This difference value is utilized to drive the adjustment circuit 72 of etalon 60 after conversion to the proper drive signal by conversion circuit 118. A similar conversion circuit 120 is responsive to the signal $k_0$ from normalizing circuit 113 to provide adjustment circuit 85 with the necessary signal for making a calibration to etalon 84.

Figure 7:
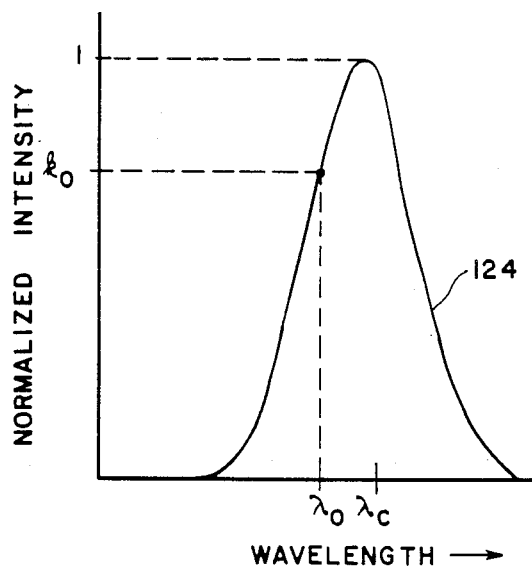
FIG. 7 is a transmissivity curve associated with one etalon of FIG. 6.

With respect to the operation of the apparatus of FIG. 6, etalon 84 is tuned, or adjusted to the maximum transmitted wavelength other than $\lambda_0$. For example, with reference to FIG. 7 illustrating the transmissivity curve 124 for etalon 84, the etalon may be adjusted to pass maximum intensity of an impinging light beam having a wavelength $\lambda_C$. The curve in FIG. 7 has been normalized such that maximum intensity is equal to 1. The reference wavelength $\lambda_0$ is displaced somewhat from $\lambda_C$ and accordingly the relative intensity of light of wavelength $\lambda_0$ would be less than 1, and is designated by the magnitude $k_0$. Neglecting the laser beam for the time being, normalizing circuit 113 receives a first input voltage indicative of the intensity of the reference beam, provided by detector 94, as well as a similar related second input voltage provided by detector 104, however at a reduced magnitude as indicated in FIG. 7. The results of the normalization in circuit 113 provides an output signal indicative of the value $k_0$ which the conversion circuitry 120 interprets as requiring no adjustment of the etalon. If for some reason, such as vibration, etalon 84 moves to cause a shifting of its transmissivity curve, then the new intensity will cause the value of $k_0$ to deviate from its initial value. This deviation is then sensed by conversion circuitry 120 which will provide an output corrective signal to adjustment circuit 85 to bring etalon 84 back to its correct position. Accordingly, there is provided a first feedback arrangement to maintain etalon 84 in a predetermined constant orientation, any deviation from which will cause the value of $k_0$ to change to thus generate a self-correction and a repositioning of the etalon to its correct orientation.

If the wavelength of the laser beam passing through etalon 84 is exactly equal to the wavelength of the reference beam passing through etalon 84 then operation of the normalization circuit 112 will result in a $k_1$ signal exactly equal to $k_0$. If the two are equal then $\Delta k$ resulting from the subtraction process of circuit 116 will be 0. Under these conditions, in a second feedback arrangement, conversion circuitry 118, responsive to the $\Delta k$ signal, will not provide any correction signal for adjustment circuit 72 and etalon 60 remains in the exact position resulting in $\lambda_1$ being equal to $\lambda_0$, the precise desired wavelength for matching the receiver.

Figure 8:
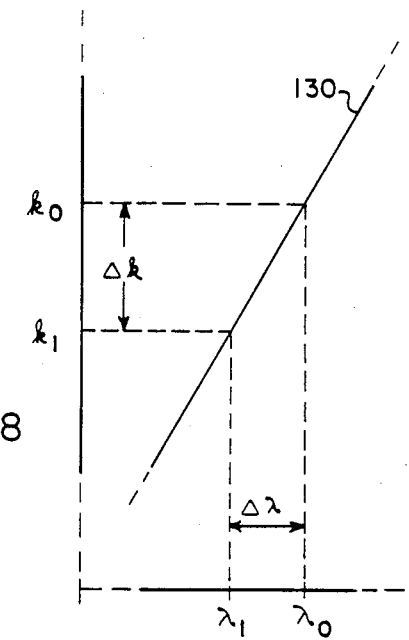
FIG. 8 is a portion of a transmissivity curve associated with another etalon of FIG. 6.

Suppose however that $\lambda_1$ deviates from its correct value of $\lambda_0$. In such instance, passage of the laser beam through etalon 84 will result in normalization circuit 112 providing an output signal k1 which is different from $k_0$. FIG. 8 shows a portion of a normalized transmissivity curve 130 associated with etalon 60. Wavelength $\lambda_0$ results in a relative output of $k_0$ while a different wavelength, $\lambda_1$ results in an output of $k_1$. The difference between $k_0$ and $k_1$ is designated $\Delta k$ corresponding to a difference in wavelength of $\Delta\lambda$ between the actual and desired beams. $\Delta k$ is the output of subtraction circuit 116 which now provides an output signal of a certain magnitude to conversion circuitry 118. In response to this signal, conversion circuitry 118 provides an output control signal to adjustment circuit 72 which in turn controls etalon 60 in a manner to change the wavelength of the laser beam from its incorrect value of $\lambda_1$ to its correct value of $\lambda_0$. Depending upon the amount of etalon movement required, the change to bring the two beams into wavelength coincidence may be accomplished in the interpulse period of the laser, or for a large change, within several pulse periods.

If during the operation of the apparatus there is any relative movement of the transmitter toward or away from the receiver, then the transmitted laser beam even though adjusted to be equal to the reference beam at the transmitter, will be different at the receiver due to Doppler shift. In order to be able to receive information under such circumstances, the wavelength of the laser beam must be adjusted slightly to accommodate for the effects of the relative velocity. This may be accomplished with the provision of a velocity measuring circuit 134 operable to provide to conversion circuit 118 a signal indicative of the relative velocity so as to proportionately add to or subtract from the control signal resulting in the etalon adjustment. If desired, the relative velocity correction may be accomplished by inputting the relative velocity signal to conversion circuit 120 for control of etalon 84.

In the illustrative embodiment of FIG. 6, first and second feedback circuits are utilized for adjusting respective etalons so that a transmitted pulsed laser beam has a wavelength identical to the wavelength of a continuous wave reference beam. If in fact a laser beam is required having a wavelength which matches no known reference source, the apparatus of FIG. 6 may still be utilized. With a known ratio between the wavelength of the desired beam and the wavelength of the available source, the apparatus may include a multiplier in the output line of either normalizing divider circuit 112 or 113, with the multiplier being operable to vary the selected value of $k_0$ or $k_1$ by the ratio factor. Alternatively, this correction may be built into either of the conversion circuits 118 or 120.

We claim:
1. Laser apparatus comprising:
   (A) a pulsed laser operable to provide a pulsed output laser beam;
   (B) an adjustable etalon positioned in the beam path within the resonant cavity of said laser to tune said laser;
   (C) means for providing a CW reference beam having a wavelength of known relationship with respect to the wavelength of said laser beam;
   (D) detection means;
   (E) means to direct samples of said laser and reference beams to said detection means for the production of corresponding output signals;
   (F) another adjustable etalon positioned in the path of a sampled laser and reference beam, prior to said detection means;
   (G) circuit means responsive to said output signals for deriving first and second feedback control signals; and
   (H) means responsive to said first and second feedback control signals for respectively adjusting said etalons.

2. Apparatus according to claim 1 wherein said detection means includes:
   (A) a first detector responsive to a sample of said reference beam to provide a corresponding first output signal proportional to the intensity of said sample;
   (B) a second detector responsive to a sample of said laser beam to provide a corresponding second output signal proportional to the intensity of said sample;
   (C) a third detector responsive to a combined sample of said laser and reference beams to provide a corresponding third output signal proportional to the intensity of said combined sample; and
   (D) means for separating said third output signal into respective laser beam and reference beam components.

3. Apparatus according to claim 2 which includes:
   (A) a normalizing circuit responsive to said first output signal and said reference beam component signal to generate a first signal indicative of the ratio of its two input signals;
   (B) another normalizing circuit responsive to said second output signal and said laser beam component signal to generate a second signal indicative of the ratio of its two input signals;
   (C) means responsive to said first ratio signal for adjusting said other etalon; and
   (D) means responsive to the difference between said first and second ratio signals for adjusting said etalon in said resonant cavity.

4. Apparatus according to claim 1 wherein said laser means includes:
   (A) means for proportionally shifting the wavelength of said laser beam.

5. Apparatus according to claim 1 which includes:
   (A) a carrier vehicle;
   (B) said laser being carried by said vehicle and operable to transmit its laser beam toward a distant receiver;
   (C) means for obtaining an indication of any relative velocity of said vehicle toward or away from said receiver; and (D) means responsive to said relative velocity indication to modify said adjustment of at least one of said etalons.

6. Apparatus according to claim 1 wherein:

(A) said reference beam has a wavelength equal to the desired wavelength of said laser beam.

7. Apparatus according to claim 1 which includes:

(A) means for causing modulation of said output laser beam with an information signal.

* * * * *